(12) United States Patent
Winkel et al.

(10) Patent No.: US 9,222,600 B2
(45) Date of Patent: Dec. 29, 2015

(54) PRESSURE-BALANCED CONTROL VALVES

(75) Inventors: Laren J. Winkel, Highland, UT (US); Fred Cain, Orem, UT (US)

(73) Assignee: Flowserve Management Company, Irving, TX (US)

( * ) Notice: Subject to any disclaimer, the term of this patent is extended or adjusted under 35 U.S.C. 154(b) by 325 days.

(21) Appl. No.: 13/148,267

(22) PCT Filed: Feb. 5, 2010

(86) PCT No.: PCT/US2010/023373
§ 371 (c)(1),
(2), (4) Date: Oct. 17, 2011

(87) PCT Pub. No.: WO2010/091291
PCT Pub. Date: Aug. 12, 2010

(65) Prior Publication Data
US 2012/0025121 A1 Feb. 2, 2012

Related U.S. Application Data

(60) Provisional application No. 61/150,261, filed on Feb. 5, 2009.

(51) Int. Cl.
*F16K 47/04* (2006.01)
(52) U.S. Cl.
CPC ........... *F16K 47/04* (2013.01); *Y10T 29/49412* (2015.01)
(58) Field of Classification Search
CPC ......... F16K 47/04; F16K 3/243; F16K 3/246; F16K 3/32; F16K 25/02; F16K 25/04; F16K 27/041; F16K 47/08; F16K 39/022; Y10T 29/49412

USPC ......... 251/332–334, 282, 363, 364, 176, 186, 251/189, 214; 137/625.3, 625.33–625.35, 137/625.37, 625.38
See application file for complete search history.

(56) References Cited

U.S. PATENT DOCUMENTS

| | | | | |
|---|---|---|---|---|
| 2,510,442 A | * | 6/1950 | Volpin | 251/191 |
| 3,491,429 A | * | 1/1970 | Willis | 29/436 |
| 3,572,382 A | * | 3/1971 | Luthe | 137/625.35 |
| 3,654,950 A | * | 4/1972 | Hamm | 137/219 |

(Continued)

FOREIGN PATENT DOCUMENTS

| CN | 2245695 Y | 1/1997 |
|---|---|---|
| CN | 101000099 A | 7/2007 |

(Continued)

OTHER PUBLICATIONS

International Search Report for corresponding PCT Application No. PCT/US2010/023373 filed Feb. 5, 2010, mailed Dec. 6, 2010, 3 pages.

(Continued)

*Primary Examiner* — Marina Tietjen
(74) *Attorney, Agent, or Firm* — TraskBritt, P.C.

(57) ABSTRACT

A valve assembly comprises a valve body comprising a plug chamber. A static seal is disposed adjacent an inner sidewall of the plug chamber, and a plug comprising a plug head is moveably positioned within the plug chamber, the plug head being configured to contact the static seal only when the plug is adjacent to a seat ring. Methods of using a valve and methods of forming a valve assembly are also disclosed.

22 Claims, 5 Drawing Sheets

(56) References Cited

U.S. PATENT DOCUMENTS

| | | | |
|---|---|---|---|
| 3,805,839 A * | 4/1974 | Baumann | 137/625.35 |
| 4,137,934 A * | 2/1979 | Rice et al. | 137/270 |
| 4,365,646 A | 12/1982 | Sandling | |
| 4,971,099 A | 11/1990 | Cyvas | |
| 5,074,519 A | 12/1991 | Pettus | |
| 5,149,055 A | 9/1992 | Huber et al. | |
| 5,265,890 A * | 11/1993 | Balsells | 277/467 |
| 5,695,197 A * | 12/1997 | Farley et al. | 277/311 |
| 5,722,637 A * | 3/1998 | Faramarzi et al. | 251/190 |
| 6,997,211 B2 * | 2/2006 | Alman et al. | 137/625.33 |
| 7,051,746 B2 | 5/2006 | Gessaman | |
| 7,640,841 B2 * | 1/2010 | An et al. | 92/168 |
| 7,926,784 B2 * | 4/2011 | Fleming | 251/282 |
| 2002/0017327 A1 * | 2/2002 | Kawaai et al. | 137/625.3 |
| 2005/0012065 A1 * | 1/2005 | Baumann | 251/282 |
| 2006/0207666 A1 * | 9/2006 | Micheel et al. | 137/625.3 |

FOREIGN PATENT DOCUMENTS

| | | |
|---|---|---|
| JP | 11-248033 A | 9/1999 |
| JP | 2005-069463 A | 3/2005 |
| WO | 9947842 A1 | 9/1999 |
| WO | WO 2010138259 A1 * | 12/2010 |

OTHER PUBLICATIONS

Written Opinion of the International Search Report for corresponding PCT Application No. PCT/US2010/023373 filed Feb. 5, 2010, mailed Dec. 6, 2010, 5 pages.

International Preliminary Report on Patentability (IPRP) for corresponding PCT Application No. PCT/US2010/023373, mailed Aug. 18, 2011.

* cited by examiner

PRESSURE-BALANCED CONTROL VALVES

CROSS-REFERENCE TO RELATED APPLICATIONS

The present application is a National Phase filing under 35 U.S.C. §371 of International Application No. PCT/US2010/023373 filed Feb. 5, 2010, which claims the benefit of the filing date of U.S. Provisional Patent application Ser. No. 61/150,261, filed Feb. 5, 2009, for "PRESSURE-BALANCED CONTROL VALVES," the contents of which are incorporated herein by reference in their entirety.

TECHNICAL FIELD

The present invention relates generally to pressure-balanced control valves. More particularly, embodiments of the present invention relate to pressure-balanced control valves comprising a shut-off sealing system.

BACKGROUND

Pressure-balanced (PB) control valves require a dynamic seal between the PB plug head and the sleeve in which the plug slides up and down. The pressure contained on the top of the plug head is nearly equal to the pressure on the bottom of the plug head, conventionally via holes that pass through the plug head. This "balance" effect on the plug head allows the plug head to be moved through high valve pressure drops with minimal actuator load. This reduces the overall cost of the valve since smaller actuators can be used to control the flow through the valve.

A dynamic seal is conventionally used to seal the area between the fluid flow path and the chamber on the top of the plug head. The dynamic seal is most often located on the outer diameter of the plug head. In cryogenic applications (−196° C.), the plastic, spring energized seals that are generally used shrink at a rate many times that of the metal parts around it. As a result the seal will leak when the plug is on the seat (valve is shut). Some cryogenic applications require leakage levels to be very low when the valve is shut. Outer diameter seals by themselves are not capable of getting very low levels of leakage.

DISCLOSURE OF THE INVENTION

According to an embodiment of the invention, a valve assembly, includes a valve body including a plug chamber, a static seal disposed adjacent an inner sidewall of the plug chamber, and a plug slidably positioned within the plug chamber and comprising a plug head configured to contact the static seal only when the plug is adjacent to a seat ring.

In other embodiments of the invention, the valve assembly can further include a dynamic seal positioned adjacent an outer diameter of the plug head. The valve assembly can include a static seal that is positioned in an annular groove in the inner sidewall of the plug chamber. The plug chamber can also comprise a sleeve structure. Additionally, the static seal can include a double coil helical spring, can comprise heat treated elgiloy or any fluoroloy material. The plug chamber may also be defined by a pressure-balanced sleeve, a seat retainer, and a seat ring.

According to another embodiment of the invention, a method of operating a valve, includes: providing a plug head comprising a dynamic seal positioned to contact an outer diameter of the plug head and an inner sidewall of a valve chamber to seal a volume therebetween; positioning the plug head in a plug chamber of a valve body in contact with a seat ring and in contact with a static seal positioned in an inner sidewall of the valve chamber; and moving the plug head longitudinally within the plug chamber and out of contact with the seat ring and the static seal.

In yet another embodiment, a method of forming a valve assembly comprises: forming a valve body comprising an inlet, an outlet and a plug chamber; positioning a dynamic seal adjacent to an outer diameter of a plug head of a plug; positioning a static seal adjacent an inner sidewall of the plug chamber; and positioning the plug into the plug chamber, the plug head being configured to contact the static seal only when the plug is positioned at least adjacent a seat ring.

MODE(S) FOR CARRYING OUT THE INVENTION

The illustrations presented herein are, in some instances, not actual views of any particular cutting element insert, cutting element, or drill bit, but are merely idealized representations which are employed to describe the present invention. Additionally, elements common between figures may retain the same numerical designation.

Figure 1:
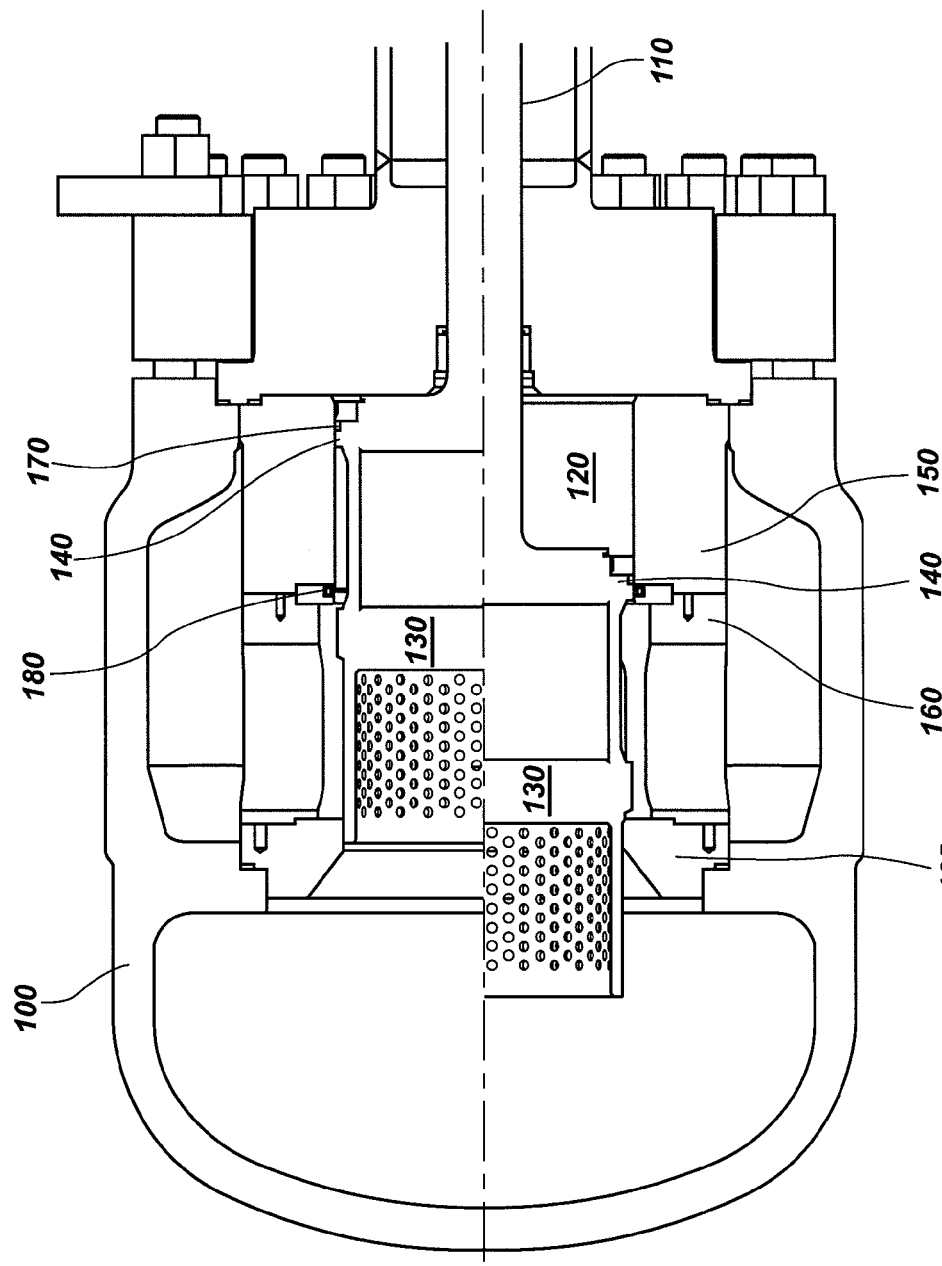
FIG. 1 illustrates a cross-section elevation view of a valve assembly according to at least one embodiment of the invention.

Various embodiments of the present invention are directed toward embodiments of a pressure-balanced control valve comprising at least one static seal and at least one dynamic seal. Referring to FIG. 1, a cross-section elevation view is shown of a valve assembly according to at least one embodiment. The valve assembly may comprise a valve body 100 comprising an inlet, an outlet, and a plug chamber. A plug 110 may be positioned within a plug chamber 120 and configured to move within the plug chamber 120. The plug 110 may comprise a plug head 130 filling a portion of the plug chamber 120. The right-side portion of FIG. 1 shows the plug 110 in a closed position (no fluid passing through the valve) and the left-side portion of FIG. 1 shows the plug 110 in an open position (fluid allowed to pass through the valve). In the embodiments shown in FIG. 1, the valve assembly may comprise a pressure-balanced valve, as is known to those of ordinary skill in the art.

Figure 2:
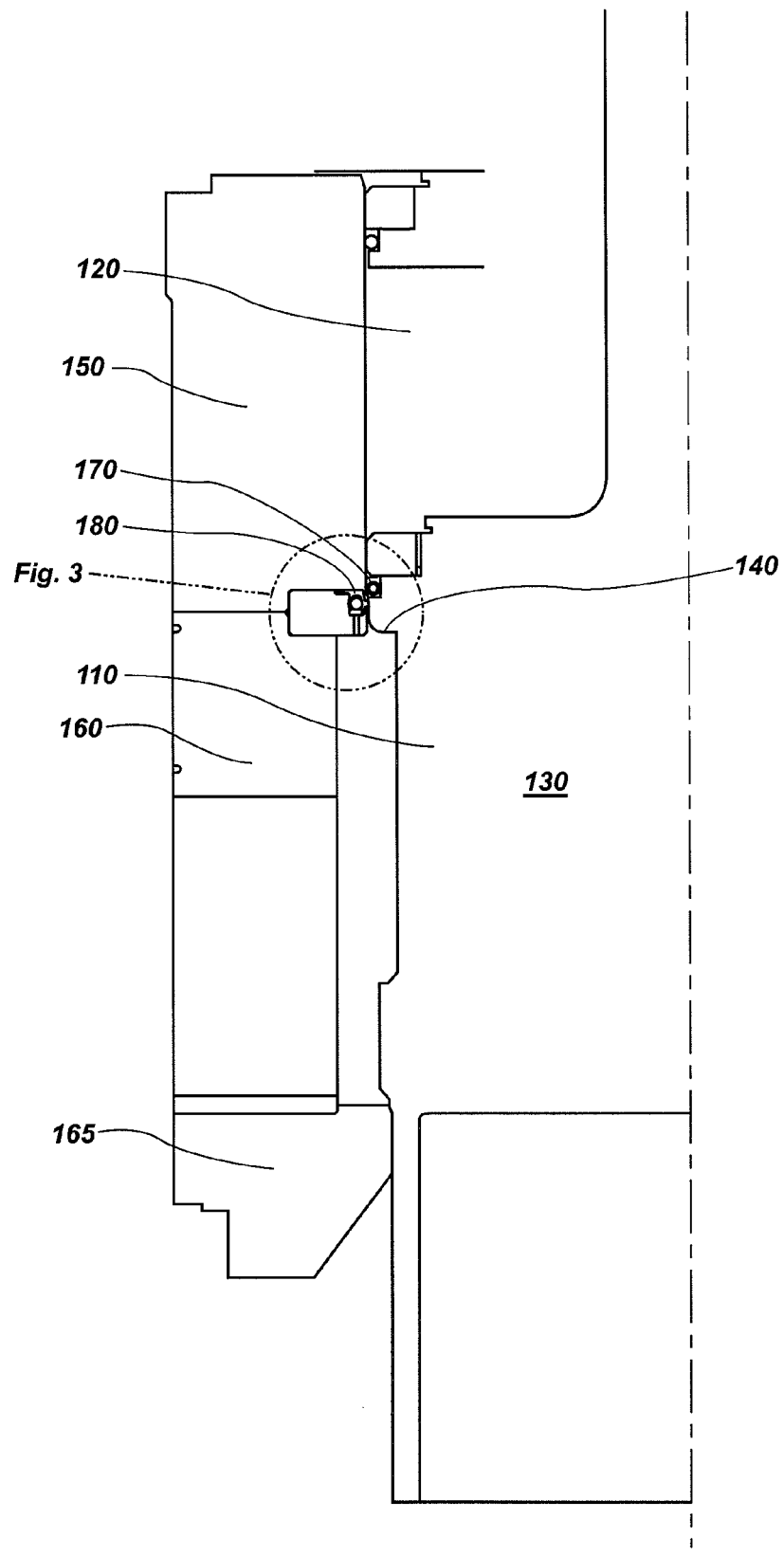
FIG. 2 illustrates a magnified cross-section elevation view of one-half of a valve assembly according to at least one embodiment of the invention.
Figure 3:
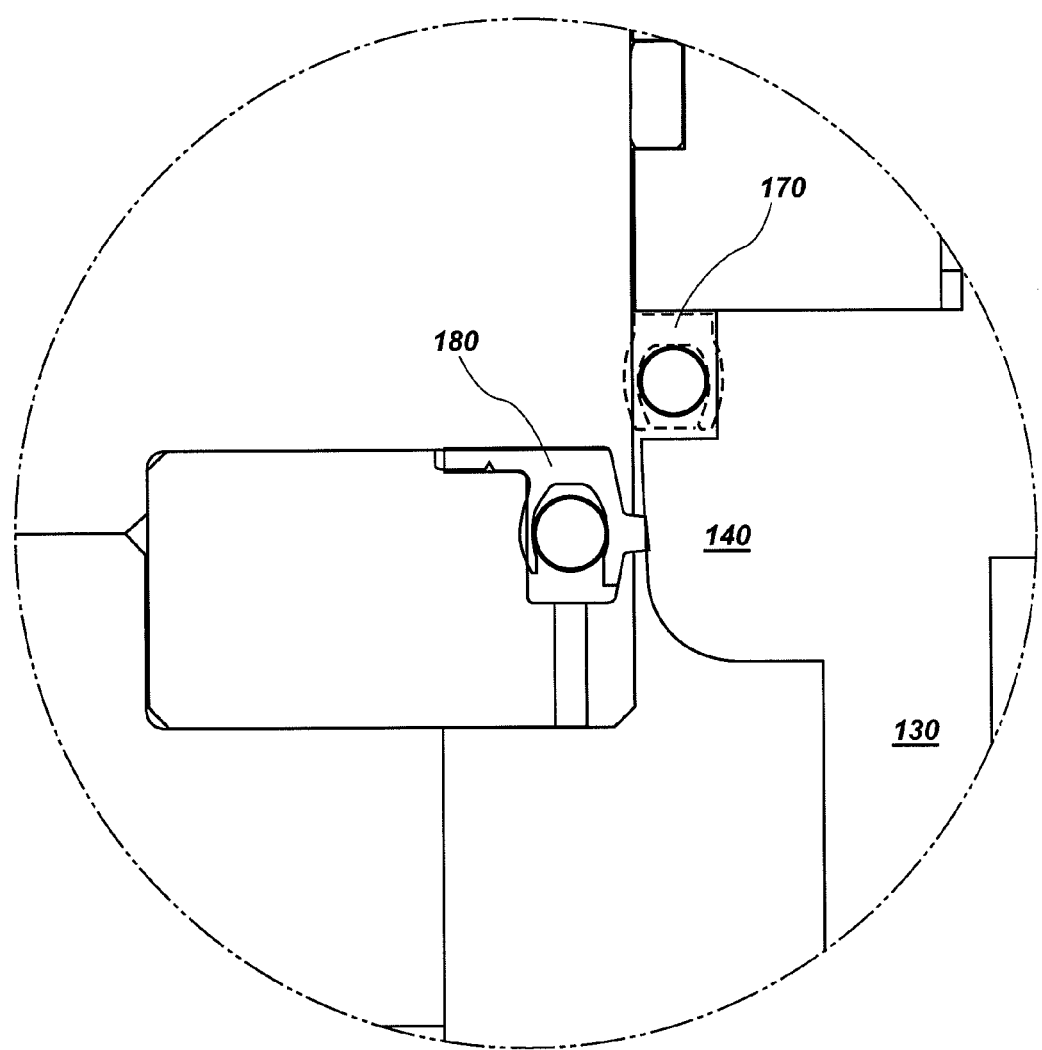
FIG. 3 is magnified view of the circled portion in FIG. 2.

In at least some embodiments, the plug head 130 comprises an annular flange 140 configured to be adjacent to an inner sidewall of the plug chamber 120. FIG. 2 shows a magnified view of a portion of the valve assembly showing the plug head 130 and FIG. 3 shows a magnified view of the circled portion of FIG. 2. In the embodiment shown, the plug chamber is defined by a pressure-balanced (PB) sleeve 150, a seat retainer 160 and a seat ring 165. The plug head 130 may comprise a dynamic seal 170, which may also be referred to as a PB seal or a PB seal ring. The dynamic seal 170 may be positioned on the outer diameter of the plug head 130 so as to be adjacent to the inner wall of the PB sleeve 150. The dynamic seal 170 aids in sealing the portion of the plug chamber 120 above the plug head 130 from fluid passage between the plug head 130 and the PB sleeve 150. In at least some embodiments, the dynamic seal 170 may be positioned in a groove located in a portion of the annular flange 140.

A static seal 180, also referred to as a static shutoff seal or a shut off seal ring, can be positioned in a portion of the inner wall of the plug chamber 120. The static seal 180 is located in the plug chamber 120 so that the plug head 130 contacts the static seal 180 at least substantially only when the plug 110 is in the closed positioned (i.e., when the plug 110 is adjacent or on the seat ring 165). In some embodiments, the static seal 180 may be positioned in an annular groove on the inner diameter of the plug chamber 120. The static seal 180 is affected when it is compressed in a radial direction by a smooth, conical surface on the plug head 130. The compression is optimized to prevent brittle fracture of the static seal 180 at cryogenic temperatures yet sufficient to provide tight leakage control. The static seal 180 is constrained by adjacent parts to prevent the seal from "blowout" when the plug head 130 pulls away under high pressure loads. The static seal 180 may comprise a conventional seal as known to those of ordinary skill in the art. By way of example and not limitation, a suitable static seal 180 may include a fluoroloy material (TFM) comprising a double coil helical spring made of heat treated elgiloy.

Figure 4:
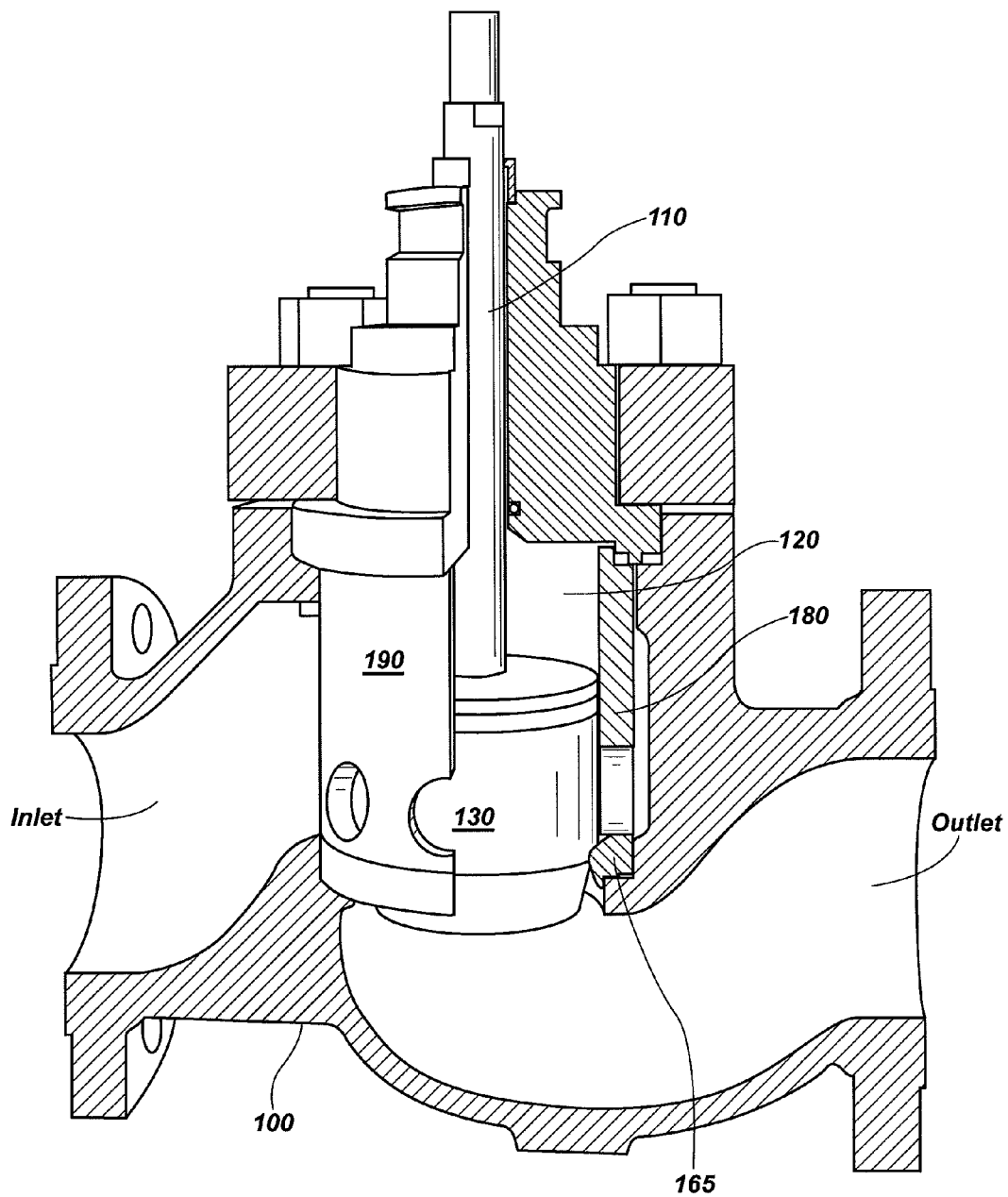
FIG. 4 is a cross-section elevation view of a valve assembly according to at least one other embodiment of the invention.
Figure 5:
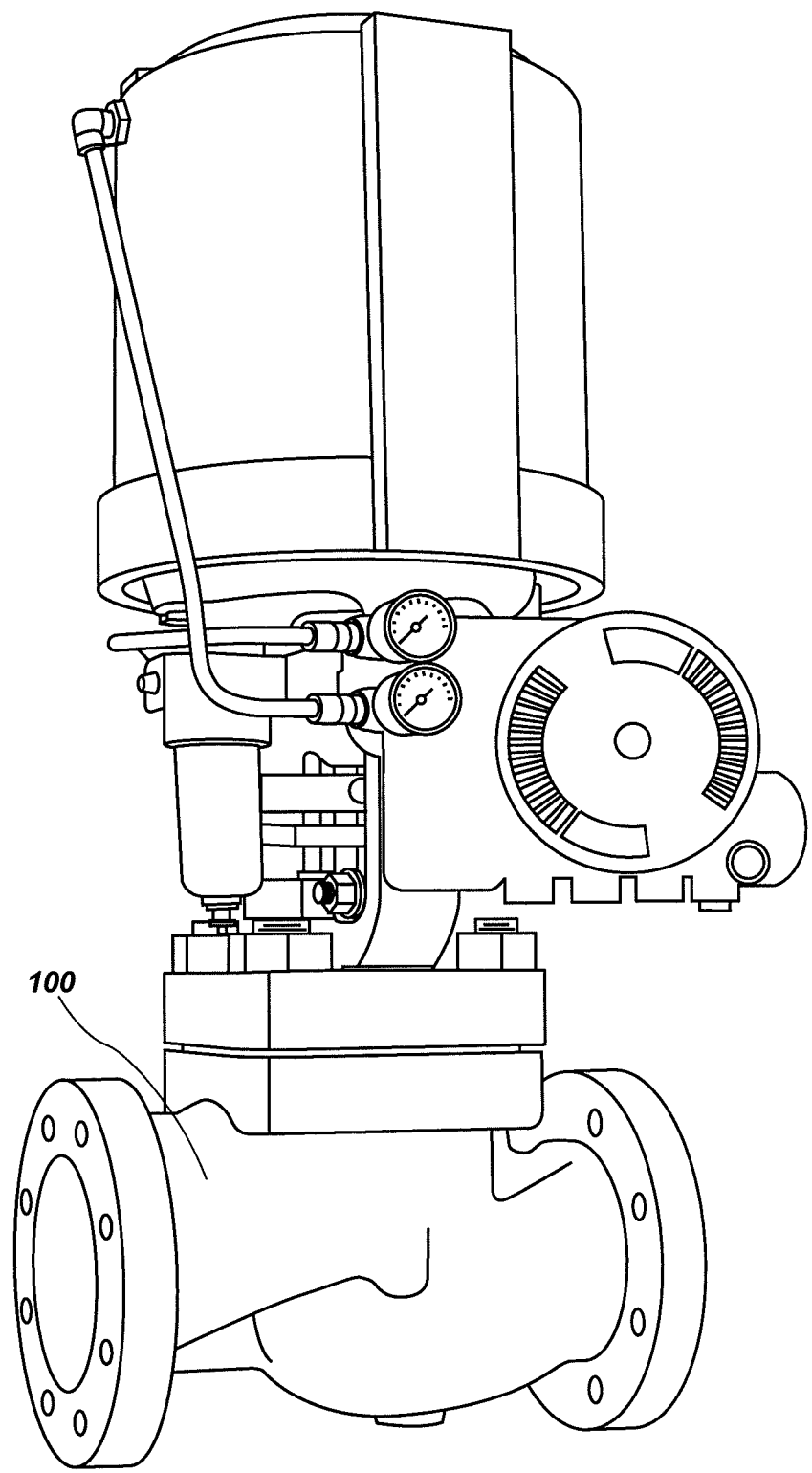
FIG. 5 is an elevation view of a valve system according to at least one embodiment of the invention.

FIG. 4 is a cross-section elevation view of a valve assembly according to at least one other embodiment. In the embodiments of FIG. 4, the PB sleeve 150 and the seat retainer 160 comprise an integral sleeve 190. FIG. 5 is an elevation view of a valve system according to at least one embodiment. A valve system may include a valve assembly, an actuator and a positioner.

In use, the plug head 130 may be moved to an open position to allow a fluid to flow through the valve. The dynamic seal 170 may move adjacent to the inner sidewall of the plug chamber 120 as the plug head 130 moves away from the seat ring 165. Furthermore, when the plug head 130 moves away from the seat ring 165, the plug head 130 releases from, or comes out of contact with the static seal 180. The plug head 130 may be moved to a closed positioned with the plug head 130 positioned in contact with the seat ring 165 to seal the valve and inhibit the flow of a fluid therethrough. A portion of the plug head 130 may be moved into contact with the static seal 180 as the plug head 130 is brought into contact with the seat ring 165.

The present invention has some potential advantages over other cryogenic PB valve systems. For example, the dual arrangement of the seals can provide redundant sealing upon shutoff for added safety and efficiency. Also, other PB cryogenic valves may utilize an ID dynamic seal where the seal is stationary under the sleeve and the plug slides against it. These seals wear out quickly due to the constant movement against the sealing surface. The static seal of the present invention can be operated to only be used when the valve shuts off, preventing unnecessary wear and leakage. Finally, while other PB cryogenic valves may provide particular levels of leakage control, they are typically designed with the dynamic plug seals far above the cryogenic fluid where the temperature is much warmer. This design can be very expensive due to the additional materials required for such a valve body neck extension.

Deep cryogenic seals are used primarily in liquid natural gas (LNG) applications where little allowance is made for internal valve leakage. The seals and system of the present invention can be used with pressure-balanced, cryogenic, control valves used in deep cryogenic applications. Deep cryogenic applications are typically defined as temperatures less than −150 F and with tighter than ASME Class IV shutoff. The LNG industry requires very tight shutoff. As a result, most control valve manufacturers size valves as unbalanced to avoid the extra leakage that occurs past the pressure-balanced seal at cryogenic temperatures. This tends to make the valve more expensive because of the larger actuators that are required. When tight shutoff can be consistently achieved in a pressure-balanced valve with a dual seal arrangement, then a competitive bidding advantage is achieved. While others are forced to unbalance the valves, pressure-balancing of the valves can be accomplished with smaller actuators and lower costs.

Additional embodiments of the invention comprise methods of making a valve assembly. Such methods may comprise forming a valve body comprising an inlet, an outlet, and a plug chamber. A dynamic seal may be positioned in an annular groove located in the outer diameter of a plug head, the plug head comprising at least one annular flange. A static seal may be positioned into a portion of the inner sidewall of the plug chamber. The plug may be positioned in the plug chamber such that the dynamic seal is in contact with the inner sidewall of the plug chamber and such that the plug head comes into contact with the static seal only when the plug is in a closed position.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and equivalents, of the claims which follow.

What is claimed is:

1. A valve assembly, comprising:
a valve body including a plug chamber;
a static seal disposed adjacent an inner sidewall of the plug chamber; and
a plug slidably positioned within the plug chamber and comprising a plug head configured to contact the static seal only when the plug is adjacent to a seat ring, the static seal located proximate a top portion of the plug head when the plug is adjacent to the seat ring, wherein the static seal is compressed against a conical, radially-outermost surface of the top portion of the plug head when the plug is adjacent to the seat ring; and
a dynamic seal positioned adjacent to the conical, radially-outermost surface of the top portion of the plug head.

2. The valve assembly of claim 1, wherein the static seal is positioned in an annular groove in the inner sidewall of the plug chamber.

3. The valve assembly of claim 1, wherein the plug chamber comprises a sleeve structure.

4. The valve assembly of claim 1, wherein the static seal comprises a double coil helical spring.

5. The valve assembly of claim 1, wherein the static seal comprises heat treated elgiloy.

6. The valve assembly of claim 1, wherein the static seal comprises fluoroloy material.

7. The valve assembly of claim 1, wherein the plug chamber is defined by a pressure-balanced sleeve, a seat retainer, and the seat ring.

8. A method of operating a valve, comprising:
providing a plug head comprising a dynamic seal positioned to contact an outer diameter of the plug head and an inner sidewall of a plug chamber of a valve body to seal a volume therebetween;

positioning the plug head in the plug chamber and in contact with a seat ring and in contact with a static seal, the static seal positioned in the inner sidewall of the plug chamber and proximate a top portion of the plug head when the plug head is in contact with the seat ring, wherein the static seal is compressed against a conical, radially-outermost surface of the top portion of the plug head when the plug head is in contact with the seat ring; and moving the plug head longitudinally within the plug chamber and out of contact with the seat ring and the static seal.

9. The method of claim 8, wherein the dynamic seal is positioned adjacent the conical, radially-outermost surface of the top portion of the plug head.

10. The method of claim 8, wherein the static seal is positioned in an annular groove in the inner sidewall of the plug chamber.

11. The method of claim 8, wherein the plug chamber comprises a sleeve structure.

12. The method of claim 8, wherein the static seal comprises a double coil helical spring.

13. The method of claim 8, wherein the static seal comprises heat treated elgiloy.

14. The method of claim 8, wherein the static seal comprises fluoroloy material.

15. The method of claim 8, wherein the plug chamber is defined by a pressure-balanced sleeve, a seat retainer, and the seat ring.

16. A method of forming a valve assembly, comprising:

forming a valve body comprising an inlet, an outlet and a plug chamber;

positioning a dynamic seal adjacent to an outer diameter of a plug head of a plug;

positioning a static seal adjacent an inner sidewall of the plug chamber; and positioning the plug into the plug chamber, the plug head being configured to contact the static seal only when the plug is positioned at least adjacent a seat ring, a top portion of the plug head located adjacent the static seal when the plug is positioned at least adjacent the seat ring, and the static seal being compressed against a conical, radially-outermost surface of the top portion of the plug head when the plug is positioned at least adjacent the seat ring.

17. The method of claim 16, wherein the static seal is positioned in an annular groove in the inner sidewall of the plug chamber.

18. The method of claim 16, wherein the plug chamber comprises a sleeve structure.

19. The method of claim 16, wherein the static seal comprises a double coil helical spring.

20. The method of claim 16, wherein the static seal comprises heat treated elgiloy.

21. The method of claim 16, wherein the static seal comprises fluoroloy material.

22. The method of claim 16, wherein the plug chamber is defined by a pressure-balanced sleeve, a seat retainer, and the seat ring.

* * * * *